Patented Feb. 22, 1949

2,462,402

UNITED STATES PATENT OFFICE 2,462,402

FLUORINATED HYDROCARBONS

Robert M. Joyce, Jr., Wilmington, Del., assignor to E. I. du Pont de Nemours & Company, Wilmington, Del., a corporation of Delaware No Drawing. Application June 30, 1945, Serial No. 602,683

8 Claims. (Cl. 260—653)

This invention relates to highly halogenated fluoroalkanes and more particularly refers to processes for the preparation of chlorofluoroalkanes from tetrafluoroethylene, as well as certain of the products thereof.

It has been known for some time that higher fluorinated propanes bearing a number of chlorine atoms may be prepared by reacting the appropriate chlorinated hydrocarbon with a fluorinating agent, such as dichloroantimony trifluoride, during which process chlorine atoms are replaced by fluorine atoms. Processes of this type are subject to the disadvantage, however, that several steps are required to reach the final product, and these steps are accompanied by difficulties which increase the expense of the process appreciably. These steps involve the synthesis of the required intermediate chlorinated propanes through condensation of such molecules as chloroform or carbon tetrachloride with trichloroethylene or tetrachloroethylene in the presence of aluminum chloride, according to the method originated by Prins. (See Rec. Trav. Chem. 51, 1065 (1932), 54, 249 (1935), 56, 119 (1937), 57, 659 (1938)). Thereafter, the resultant chlorinated propane is subjected to fluorination by suitable agents, for instance the aforementioned dichloroantimony trifluoride. In many instances, the exchange of fluorine for chlorine atoms proceeds with difficulty and in unsatisfactorily low yields.

It is an object of this invention to provide a simple, one-step process for the preparation of polyhalogenated fluoroalkanes. A further object is to avoid the necessity of substituting fluorine atoms for chlorine atoms in the prior art processes referred to previously. A still further object is to produce polyhalogenated fluoroalkanes from tetrafluoroethylene by a simple and inexpensive process. A still further object is to produce new polyhalogenated fluoralkanes. Additional objects will become apparent from a consideration of the following description and claims.

In accordance with this invention these objects are accomplished by reacting tetrafluoroethylene with a polyhalogenated alkane in the presence of a Friedel-Crafts catalyst. In a more restricted sense this invention is concerned with the reaction of tetrafluoroethylene with a polyhalogenated methane, particularly one containing no more than two fluorine atoms and one or more chlorine atoms in the presence of a polyvalent metal halide Friedel-Crafts catalyst, preferably aluminum chloride. In a still more restricted and preferred embodiment of the invention it is directed to the reaction of tetrafluoroethylene with a methane derivative containing a plurality of chlorine atoms and optionally one or two fluorine atoms in the presence of aluminum chloride. In one of the specific embodiments of the invention the foregoing reactions are carried out by adding the reactants together with the catalytic agent at relatively low temperature to a pressure reactor and then carrying out the reaction at appropriate temperature under autogenous pressure. The desired products may be conveniently isolated by washing the reaction mass with water to decompose the catalytic agent, followed by distillation at ordinary or reduced pressure.

This process is believed to be somewhat of a scientific anomaly since heretofore it was generally conceded that it would be impossible to condense fluorinated molecules of methane or ethylene with aliphatic or aromatic compounds in the presence of Friedel-Crafts catalysts. As a matter of fact, so far as is known, it was accepted as a foregone conclusion that an exchange of halogen atoms would occur between the fluorinated hydrocarbon and the aluminum chloride, thereby defeating the purposes of the reaction.

This invention may be more readily understood by a consideration of the following illustrative examples wherein the quantities are stated in parts by weight.

Example 1

Two hundred and thirty-six parts of chloroform and 23 parts of anhydrous aluminum chloride were charged into a silver-lined autoclave. The autoclave was flushed with nitrogen, cooled and 78 parts of tetrafluoroethylene added. The mixture was heated at 85° C. with agitation for 24 hours. At the end of this time the autoclave was free from pressure. The aluminum chloride complex was decomposed by means of ice and hydrochloric acid. Distillation of the product yielded 141.9 parts boiling at 91° C. ($n_D^{25}$, 1.3704; $d_4^{25}$, 1.6115) and small amounts of higher boiling fractions. The principal product which boils at 91° C. is a trichlorotetrafluoropropane and probably 1,1,3 - trichloro-2,2,3,3 - tetrafluoropropane. Analysis: Calc'd. for $C_3F_4Cl_3H$: F, 34.6; Cl, 48.5. Found: F, 32.72; Cl, 47.43.

Example 2

Two hundred and eighty parts of freshly distilled carbon tetrachloride and 10 parts of anhydrous aluminum chloride were charged into a silver-lined autoclave. The autoclave was flushed with nitrogen, 70 parts of tetrafluoroethylene was added and then closed. The autoclave was heated with agitation at 65° C. for 4 hours. At the end of this time no pressure remained in the autoclave and the reaction mixture was treated with ice and hydrochloric acid. The product was extracted with ether, dried over anhydrous calcium sulfate and distilled. One hundred and sixty-six parts of a product boiling at 114° C. ($n_D^{25}$, 1.3974; $d_4^{25}$, 1.6927) and 1.7 parts of higher boiling chlorine-containing products were obtained. The principal product is a tetrachloro - tetrafluoropropane and probably 1,1,1,3-tetrachloro - 2,2,3,3 - tetrafluoropropane. Analysis: Calc'd. for $C_3F_4Cl_4$: F, 29.9; Cl, 55.5. Found: F, 29.83, Cl, 56.0.

Example 3

A silver-lined autoclave was charged with 2 parts of aluminum chloride. It was then cooled in a solid carbon dioxide-acetone mixture, evacuated and 50 parts of tetrafluoroethylene and 69 parts of monofluorotrichloromethane were added by distillation from cylinders. The autoclave was closed and then heated and shaken for 14 hours while the temperature was slowly raised from 61° to 80° C. It was then cooled, opened and the liquid product discharged and washed with a mixture of water and hydrochloric acid. The products from three such reactions were combined, dried over calcium chloride and distilled. There was thus obtained 194 parts of a trichloropentafluoropropane, boiling at 72–73° C. ($n_D^{25}$, 1.3578; $d_4^{25}$, 1.6429.) The structure of the product is believed to correspond to 1,1,3-trichloro-1,2,2,3,3-pentafluoropropane. Analysis: Calc'd. for $C_3F_5Cl_3$: Cl, 44.9. Found: Cl, 44.7.

Example 4

A silver-lined autoclave was charged with 5 parts of anhydrous aluminum chloride. The autoclave was cooled in a solid carbon dioxide-acetone mixture, evacuated and 52 parts of monofluorodichloromethane and 50 parts of tetrafluoroethylene were distilled into it from cylinders. The autoclave was closed and then heated for ten hours while agitating at 100° C. The autoclave was opened and the product discharged and washed with a mixture of water and hydrochloric acid. The products of two such reactions were combined, dried over anhydrous calcium chloride and then distilled. There was thus obtained 94 parts of a dichloropentafluoropropane boiling at 51–53° C. ($n_D^{25}$, 1.3262; $d_4^{25}$, 1.5492). The structure of the product is believed to correspond to 1,3-dichloro-1,2,2,3,3-pentafluoropropane. Analysis: Calc'd. for $C_3F_5HCl_2$: C, 18.3, Cl, 34.9. Found: C, 18.1, Cl, 33.8.

It is to be understood that the aforementioned examples are representative merely of a few of the many practical embodiments of this invention. They may be varied widely with respect to the individual reactants, the amounts thereof and the conditions of reaction without departing from the scope of the invention.

Thus, polyhalogenated alkanes such as carbon tetrachloride, chloroform, difluorochloromethane, difluorodichloromethane, monofluorotrichloromethane, monofluorodichloromethane and corresponding derivatives of the higher alkanes may be employed. If desired, a plurality of these alkane derivatives may be utilized in accordance with the processes hereof. The preferred alkane derivatives are, of course, those specifically referred to heretofore, although the invention is not confined thereto.

Tetrafluoroethylene is the preferred compound for reaction with the polyhalogenated alkane. It is contemplated, however, that other halogenated ethylene or vinyl derivatives may be employed in lieu thereof or in addition thereto.

The reaction is carried on in the presence of polyvalent metal halide Friedel-Crafts catalysts. These catalysts are well known and need not be referred to in detail, although for purposes of illustration mention may be made of boron trifluoride, zinc chloride, ferric chloride, etc.

The temperature of the reaction may be varied widely although for optimum results it is advisable to operate at normal or slightly elevated temperatures. In general, temperatures within the range of 0° C. to 100° C. are employed. It might be mentioned, however, that satisfactory results have been obtained with temperatures as high as 150° C., although elevated temperatures of this magnitude are, as a rule, not preferred.

The pressure at which the reaction is carried out may likewise be varied widely from subatmospheric to superatmospheric. In general, it is advisable to carry out the reaction at somewhat elevated pressures, particularly autogenous pressures, as illustrated in the examples.

Isolation of the reaction products may be accomplished by various methods, particularly decomposition of the catalytic agent with cold water, followed by distillation.

Products hereof, either alone or in combination with one another, are useful as dielectrics, cooling liquids, petroleum treating chemicals and intermediates.

By means of this invention the cumbersome and inefficient prior art processes for the preparation of highly halogenated fluoroalkanes are avoided. In their stead an efficient, one-step process may be employed. This process utilizes readily available reactants. The process may be varied widely, depending upon the reactants, the type of product desired, and the purposes for which the products are to be used. It is inexpensive and produces an excellent yield of the desired products.

As many widely different embodiments of this invention may be made without departing from the spirit and scope hereof, it is to be understood that the invention is not limited to the specific embodiments hereof except as defined in the appended claims.

I claim:

1. A process which comprises contacting tetrafluoroethylene with a polyhalogenated methane containing at least one chlorine atom and no more than two fluorine atoms in the presence of a polyvalent metal halide Friedel-Crafts catalyst under autogenous pressure at a temperature between 0° and 150° C.

2. A process which comprises contacting tetrafluoroethylene with a polyhalogenated methane containing a plurality of chlorine atoms and no more than two fluorine atoms in the presence of a polyvalent metal halide Friedel-Crafts catalyst under autogenous pressure at a temperature between 0° and 150° C.

3. A process which comprises contacting tetrafluoroethylene with a polyhalogenated methane containing at least one chlorine atom and no more than two fluorine atoms in the presence of aluminum chloride under autogenous pressure at a temperature between 0° and 150° C.

4. A process which comprises contacting tetrafluoroethylene with a polyhalogenated methane containing at least three halogen atoms of which at least one is chlorine and no more than two are fluorine, in the presence of aluminum chloride under autogenous pressure at a temperature between 0° and 150° C.

5. A process which comprises contacting tetrafluoroethylene with monofluorodichloromethane in the presence of aluminum chloride under autogenous pressure at a temperature between 0° and 150° C.

6. A process which comprises contacting tetrafluoroethylene with monofluorotrichloromethane in the presence of aluminum chloride under autogenous pressure at a temperature between 0° and 150° C.

7. A process which comprises contacting tetrafluoroethylene with carbon tetrachloride in the presence of aluminum chloride under autogenous pressure at a temperature between 0° and 150° C.

8. The chemical compound, 1,3-dichloro-1,2,2,3,3-pentafluoropropane boiling at 51–53° C. ($n_D^{25}$, 1.3262; $d_4^{25}$, 1.5492).

ROBERT M. JOYCE, Jr.

REFERENCES CITED

The following references are of record in the file of this patent:

McBee et al., "Journal of the American Chemical Society," vol. 62, page 3341 (1940).

Henne et al., "Journal of the American Chemical Society," vol. 61, page 2490 (1939); vol. 63, pages 3477, 3479 (1941); vol. 64, page 1158 (1942); vol. 65, page 2363 (1943).

Prins "Receuil des travaux chimiques des Pays Bas," vol. 51, pages 1065–7 (1932).